(12) United States Patent
Chen et al.

(10) Patent No.: US 11,245,452 B2
(45) Date of Patent: Feb. 8, 2022

(54) INFORMATION SENDING, INFORMATION DETERMINING AND RELATIONSHIP DETERMINING METHODS AND DEVICES

(71) Applicant: ZTE Corporation, Shenzhen (CN)

(72) Inventors: Yijian Chen, Shenzhen (CN); Yu Ngok Li, Shenzhen (CN); Jianxing Cai, Shenzhen (CN); Huahua Xiao, Shenzhen (CN); Yong Li, Shenzhen (CN); Yuxin Wang, Shenzhen (CN); Zhaohua Lu, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/838,425

(22) Filed: Apr. 2, 2020

(65) Prior Publication Data

US 2020/0235798 A1 Jul. 23, 2020

Related U.S. Application Data

(63) Continuation of application No. 15/763,272, filed as application No. PCT/CN2016/093960 on Aug. 8, 2016, now Pat. No. 10,651,910.

(30) Foreign Application Priority Data

Sep. 25, 2015 (CN) .......................... 201510623608.4

(51) Int. Cl.
*H04B 7/06* (2006.01)
*H04W 72/04* (2009.01)
*H04L 5/00* (2006.01)

(52) U.S. Cl.
CPC ........... *H04B 7/0626* (2013.01); *H04L 5/005* (2013.01); *H04L 5/0053* (2013.01);
(Continued)

(58) Field of Classification Search
None
See application file for complete search history.

(56) References Cited

U.S. PATENT DOCUMENTS

2013/0322373 A1 12/2013 Jeon
2014/0119266 A1 5/2014 Ng
(Continued)

FOREIGN PATENT DOCUMENTS

CN 103001678 A 3/2013
CN 103795513 A 5/2014
(Continued)

OTHER PUBLICATIONS

International Search Report for corresponding application PCT/CN2016/093960 filed on Aug. 8, 2016; dated Nov. 9, 2016.
(Continued)

*Primary Examiner* — Diane L Lo
(74) *Attorney, Agent, or Firm* — Crowell & Moring LLP

(57) ABSTRACT

Information sending, information determining and relationship determining methods and devices are provided. According to the information sending method, a base station sends M parameter sets via high-layer signaling, wherein M>=1, M is a positive integer, each parameter set includes quasi-co-location Non-Zero Power (NZP) Channel State Information Reference Signal (CSI-RS) indication information, and the quasi-co-location NZP CSI-RS indication information is used by a terminal to acquire a large-scale characteristic of a channel; and when M>1, the base station indicates, via a physical-layer control signaling, parameter set selection information of a subframe on which the physical-layer control signaling is sent.

9 Claims, 5 Drawing Sheets

A terminal determines a set of N quasi-co-location relationship types, N>=1 — S401

When N=1, the terminal determines a quasi-co-location relationship between antenna ports according to the quasi-co-location relationship type — S402

When N>1, the terminal determines a set of quasi-co-location relationships between the antenna ports according to the N quasi-co-location relationship types and type indication signaling configured by high-layer signaling — S403

(52) U.S. Cl.
CPC .......... *H04L 5/0057* (2013.01); *H04L 5/0094* (2013.01); *H04W 72/04* (2013.01); *H04L 5/0007* (2013.01); *H04W 72/042* (2013.01); *H04W 72/0446* (2013.01)

(56) References Cited

U.S. PATENT DOCUMENTS

| | | | |
|---|---|---|---|
| 2015/0146644 A1 | 5/2015 | Kim | |
| 2015/0208392 A1* | 7/2015 | Park | H04B 7/024 370/329 |
| 2015/0215906 A1 | 7/2015 | Park | |
| 2015/0223208 A1 | 8/2015 | Park | |
| 2015/0230220 A1* | 8/2015 | Li | H04L 5/0053 370/329 |
| 2015/0304081 A1 | 10/2015 | Park | |
| 2015/0334762 A1* | 11/2015 | Yang | H04W 76/15 370/329 |
| 2016/0006547 A1* | 1/2016 | Kang | H04L 5/0094 370/329 |
| 2016/0105882 A1* | 4/2016 | Park | H04L 5/0053 370/329 |
| 2017/0331541 A1 | 11/2017 | Kang | |
| 2018/0287681 A1 | 10/2018 | Chen | |

FOREIGN PATENT DOCUMENTS

| | | |
|---|---|---|
| CN | 104106223 A | 10/2014 |
| CN | 104350695 A | 2/2015 |
| CN | 104704754 A | 6/2015 |
| CN | 104704786 A | 6/2015 |
| JP | 201496777 A | 5/2014 |

OTHER PUBLICATIONS

European Search Report for corresponding application EP 16 84 7915; Report dated Aug. 22, 2018.
European Patent Office Communication for corresponding application EP16847915.2; Report dated Jul. 18, 2019.
European Patent Office Communication for corresponding application EP16847915.2; Report dated Mar. 12, 2021.

* cited by examiner

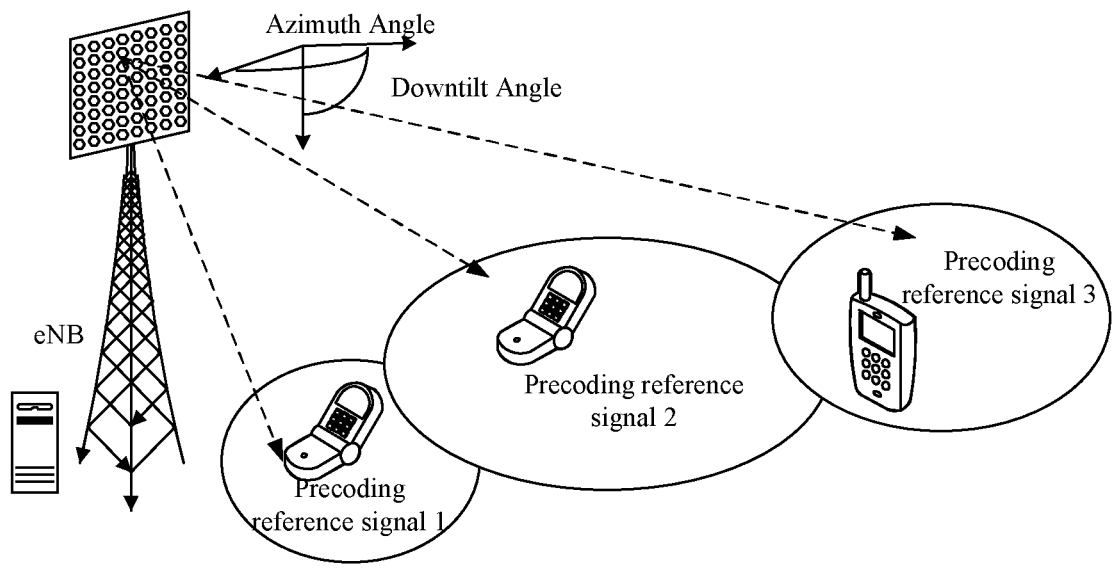

Fig. 1

A base station sends M parameter sets via high-layer signaling, wherein M>=1, M is a positive integer, each parameter set at least includes quasi-co-location NZP CSI-RS indication information, and the quasi-co-location NZP CSI-RS indication information is used by a terminal to acquire a large-scale characteristic of a channel — S201

When M>1, the base station indicates, via a physical-layer control signaling, parameter set selection information of a subframe on which the physical-layer control signaling is sent — S202

Fig. 2

INFORMATION SENDING, INFORMATION DETERMINING AND RELATIONSHIP DETERMINING METHODS AND DEVICES

CROSS REFERENCE TO RELATED APPLICATION

This application is a continuation of U.S. patent application Ser. No. 15/763,272 filed on Mar. 26, 2018, which is the U.S. National Phase of International Patent Application Number PCT/CN2016/093960 which was filed on Aug. 8, 2016 claiming priority to Chinese Patent Application Number 201510623608.4 filed on Sep. 25, 2015, where the entire contents of said applications are incorporated herein by reference in their entirety.

TECHNICAL FIELD

The application relates to, but is not limited to, the field of communications, and particularly to information sending, information determining and relationship determining methods and devices.

BACKGROUND

During channel demodulation, if a terminal can acquire some statistical characteristic parameters of a channel between a base station and the terminal in advance, the terminal may effectively utilize these statistical characteristic parameters to improve estimation accuracy of a demodulation reference signal, improve receiver performance and effectively suppress noise. The terminal may apply the statistical characteristic parameters to different estimation algorithms and receiving algorithms. It should be noted that such statistical channel characteristics can be accurately measured by virtue of reference signals sent by the same base station, that is, these statistical characteristic parameters are usually measured based on reference signals, for example, a Channel State Information Reference Signal (CSI-RS) or a Cell specific Reference Signal (CRS), sent by the same base station.

In addition, when a base station sends a signal, components in the base station may not be so ideal and introduction of errors is inevitable, so that the problems of frequency deviation and time deviation in a practical system are unavoidable. Generally speaking, calibration of frequency deviation and time deviation can be completed based on measurement performed through CSI-RSs or CRSs sent by the same base station.

In a Long Term Evolution (LTE)/Long Term Evolution-Advanced (LTE-A) system, when multipoint transmission is supported, since a base station sending data is transparent for a terminal and the base station sending the data may be dynamically switched, the terminal can not accurately learn about the specific base station sending the data received by the terminal. Therefore, a definition and notification signaling of a quasi-co-location indicator are introduced.

A quasi-co-location indicator indicates that a CSI-RS sent and notified by current data and a CSI-RS sent and notified by a dedicated de-Modulation Reference Signal (DMRS) are quasi-co-located, and the two sent and notified CSI-RSs have approximately the same large-scale characteristic of a channel, for example, delay spread, Doppler spread, Doppler shift and average delay. The CSI-RSs being quasi-co-located represents that the current data and the DMRS are sent approximately by the same base station. In the standard 3rd Generation Partnership Project (3GPP) TS 36.213, a quasi-co-location indicator and Resource Element (RE) mapping related information are jointly notified. Table 1 shows a meaning of each state of quasi-co-location indicator and data channel RE mapping notification signaling.

TABLE 1

Meaning of Each State of Quasi-Co-Location Indicator and Data Channel RE Mapping Notification Signaling

| Value of 'Physical Downlink Shared Channel (PDSCH) RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

As shown in Table 1, in the quasi-co-location indicator and data channel RE mapping notification signaling, 2 bit physical-layer Downlink Control Information (DCI) is adopted to dynamically indicate up to 4 parameter sets, each set including a set of parameters. The set of parameters may include the following multiple types of information:

configuration parameter information of a CRS, including parameters such as the ports count and a frequency domain shift;

Multimedia Broadcast multicast service Single Frequency Network (MBSFN) subframe configuration parameter information;

parameter configuration information of a Zero Power (ZP) CSI-RS, configuration information of a data channel start symbol parameter; and quasi-co-location Non-Zero Power (NZP) CSI-RS information.

It can be seen that, when a base station sends data to a terminal, the base station may be dynamically switched. An RE mapping problem and a problem of change of a quasi-co-location of reference signal and data transmission may be solved by dynamically indicating the abovementioned information through the 2 bit signaling.

In earlier versions, CSI-RSs are all non-precoding reference signals, so that a base station usually sends only one set of CSI-RSs. However, due to increase of reference signal and feedback overhead, after precoding CSI-RSs are introduced, there may be a situation in which the same base station sends multiple precoding reference signals. Since different precoding reference signals correspond to different precoding weights respectively, the use of multiple precoding reference signals equivalently generates multiple virtual cells. FIG. 1 is a schematic diagram illustrating the generation multiple virtual cells under the condition of different precoding reference signals.

Different precoding reference signals are supported in the following manners.

A First Manner:

Table 2 shows a condition in which different precoding reference signals explicitly correspond to multiple sets of different reference signal configurations.

TABLE 2

Different Precoding Reference Signals Explicitly Correspond to Multiple Sets of Different Reference Signal Configurations

| | | |
|---|---|---|
| NZP CSI-RS configuration 1 | Precoding reference signal 1 | Precoding weight1/ Beam 1 |
| NZP CSI-RS configuration 2 | Precoding reference signal 2 | Precoding weight1/ Beam 1 |
| ... | ... | ... |
| NZP CSI-RS configuration N | Precoding reference signal N | Precoding weight1/ Beam N |

A Second Manner:

Table 3 shows a condition in which different port groups under the same set of NZP CSI-RS configuration correspond to precoding reference signals with different weights.

TABLE 3

Reference Signals on Different Port Groups under the Same Set of NZP CSI-RS Configuration Correspond to Precoding Reference Signals with Different Weights respectively

| | | | |
|---|---|---|---|
| NZP CSI-RS configuration i | Port group 1 | Precoding reference signal 1 | Precoding weight1/ Beam 1 |
| | Port group 2 | Precoding reference signal 2 | Precoding weight1/ Beam 2 |
| | ... | ... | ... |
| | Port group N | Precoding reference signal N | Precoding weight1/ Beam N |

A Third Manner:

Table 4 shows a condition in which reference signals on different subframes under the same NZP CSI-RS configuration i correspond to precoding reference signals with different weights respectively.

TABLE 4

Reference Signals on Different Subframes under the Same NZP CSI-RS Configuration i Correspond to Precoding Reference Signals with Different Weights respectively

| | | | |
|---|---|---|---|
| NZP CSI-RS configuration i | Subframe a | Precoding reference signal 1 | Precoding weight1/ Beam 1 |
| | Subframe b | Precoding reference signal 2 | Precoding weight1/ Beam 2 |
| | ... | ... | ... |
| | Subframe n | Precoding reference signal N | Precoding weight1/ Beam N |

A Fourth Manner:

Table 5 shows a condition in which reference signals at different frequency domain positions under the same set of NZP CSI-RS configuration i correspond to precoding reference signals with different weights respectively.

TABLE 5

Reference Signals at Different Frequency Domain Positions under the Same Set of NZP CSI-RS Configuration i Correspond to Precoding Reference Signals with Different Weights

| | | | |
|---|---|---|---|
| NZP CSI-RS configuration i | Sub-band a | Precoding reference signal 1 | Precoding weight1/ Beam 1 |
| | Sub-band b | Precoding reference signal 2 | Precoding weight1/ Beam 2 |
| | ... | ... | ... |
| | Sub-band n | Precoding reference signal N | Precoding weight1/ Beam N |

Thus, it can be seen that downlink quasi-co-location indicator and data channel RE mapping notification signaling supports notification of only one set of NZP CSI-RS configuration for quasi-co-location binding with a data channel which is transmitted at present. However, for the second, third or fourth manner, notification of related quasi-co-location information cannot distinguish between different ports, different subframes and different sub-bands (frequency domain), so that the adoption of these manners may influence channel estimation performance and receiver performance. Moreover, for the first, second, third or fourth manner, when multiple beams are present in a cell, multiple virtual cells shown in FIG. 1 may be formed, and under such a circumstance, the 2 bit downlink quasi-co-location indicator and data channel RE mapping notification signaling may not meet a requirement.

For the problem that a large-scale characteristic of a channel acquired by a terminal is inaccurate due to indefinite indication in quasi-co-location information notification signaling, there is yet no solution at present.

SUMMARY

The below is a summary about subject matter described in the present disclosure in detail. The summary is not intended to limit the scope of protection of the claims.

Embodiments of the present disclosure provide information sending, information determining and relationship determining methods and devices, which may solve a problem of low channel estimation performance of a terminal due to the fact that different precoding reference signals are not distinguished in quasi-co-location information notification signaling.

An information sending method may include the following steps. A base station sends M parameter sets via high-layer signaling, where M>=1, M may be a positive integer, each parameter set may include quasi-co-location NZP CSI-RS indication information, and the quasi-co-location NZP CSI-RS indication information may be used by a terminal to acquire a large-scale characteristic of a channel. When M>1, the base station indicates, via a physical-layer control signaling, parameter set selection information of a subframe on which the physical-layer control signaling is sent.

In an exemplary embodiment, the quasi-co-location NZP CSI-RS indication information in each parameter set may include indication information of one or more quasi-co-location NZP CSI-RS port groups.

In an exemplary embodiment, the one or more quasi-co-location NZP CSI-RS port groups may correspond to the same set of NZP CSI-RS configuration.

In an exemplary embodiment, the quasi-co-location NZP CSI-RS indication information in each parameter set may include quasi-co-location CSI-RS time domain location indication information.

In an exemplary embodiment, the quasi-co-location CSI-RS time domain location indication information may include any one of offset information indication information and subframe set indication information.

In an exemplary embodiment, the quasi-co-location NZP CSI-RS indication information in each parameter set may include quasi-co-location CSI-RS frequency domain location indication information.

In an exemplary embodiment, the quasi-co-location CSI-RS frequency domain location indication information may include any one of Resource Block (RB) set information and sub-band set information.

In an exemplary embodiment, each parameter set may include quasi-co-location NZP CSI-RS configuration indication information. The quasi-co-location NZP CSI-RS configuration indication information may indicate Y sets of NZP CSI-RS configurations, Y>=2, and Y may be a positive integer.

In an exemplary embodiment, a DMRS port in the subframe and a CSI-RS port corresponding to the quasi-co-location NZP CSI-RS indication information may be quasi-co-located.

An information determining method may include the following acts. A terminal receives M parameter sets via high-layer signaling, where M>=1, M may be a positive integer, each parameter set may include quasi-co-location NZP CSI-RS indication information, and the quasi-co-location NZP CSI-RS indication information may be used by the terminal to acquire a large-scale characteristic of a channel. When M=1, the terminal determines quasi-co-location CSI-RS information according to the quasi-co-location NZP CSI-RS indication information; alternatively, when M>1, the terminal receives parameter set selection information via physical-layer control signaling, and determines, according to the quasi-co-location NZP CSI-RS indication information and the parameter set selection information, quasi-co-location CSI-RS information of a DMRS in a subframe on which the physical-layer control signaling is sent.

In an exemplary embodiment, the quasi-co-location NZP CSI-RS indication information in each parameter set may include indication information of one or more quasi-co-location NZP CSI-RS port groups.

In an exemplary embodiment, the one or more quasi-co-location NZP CSI-RS port groups may correspond to the same set of NZP CSI-RS configuration.

In an exemplary embodiment, the quasi-co-location NZP CSI-RS indication information in each parameter set may include quasi-co-location CSI-RS time domain location indication information.

In an exemplary embodiment, the quasi-co-location CSI-RS time domain location indication information may include any one of offset information indication information and subframe set indication information.

In an exemplary embodiment, the quasi-co-location NZP CSI-RS indication information in each parameter set may include quasi-co-location CSI-RS frequency domain location indication information.

In an exemplary embodiment, the quasi-co-location CSI-RS frequency domain location indication information may include any one of RB set information and sub-band set information.

In an exemplary embodiment, each parameter set may include quasi-co-location NZP CSI-RS configuration indication information. The quasi-co-location NZP CSI-RS configuration indication information indicates Y sets of quasi-co-location NZP CSI-RS configurations, where Y>=2, and Y may be a positive integer.

A relationship determining method may include the following steps. A terminal determines a set of N quasi-co-location relationship types, where N>=1 and N is a positive integer. When N=1, the terminal determines a quasi-co-location relationship between antenna ports according to the quasi-co-location relationship type; alternatively, when N>1, the terminal determines a set of quasi-co-location relationships between the antenna ports according to the N quasi-co-location relationship types and type indication signaling configured by high-layer signaling.

In an exemplary embodiment, the relationship determining method may further include the following step. The terminal determines the set of the N quasi-co-location relationship types according to a Precoding Matrix Indicator (PMI) enabling configuration parameter.

In an exemplary embodiment, the relationship determining method may further include the following step. The terminal determines the set of the N quasi-co-location relationship types according to a measurement restriction configuration parameter.

In an exemplary embodiment, the N quasi-co-location relationship types may include a following type: the terminal may assume that dedicated DMRS ports 7-14 and CRS ports 0-3 indicated by quasi-co-location measurement reference signal configuration signaling of a base station are quasi-co-located.

An information sending device may include a first sending module and a second sending module.

The first sending module may be configured to send M parameter sets via high-layer signaling, where M>=1, M may be a positive integer, each parameter set may include quasi-co-location NZP CSI-RS indication information, and the quasi-co-location NZP CSI-RS indication information may be used by a terminal to acquire a large-scale characteristic of a channel. The second sending module may be configured to, when M>1, indicate, via a physical-layer control signaling, parameter set selection information of a subframe on which the physical-layer control signaling is sent.

An information determining device may include a receiving module, a first determination module and a second determination module.

The receiving module may be configured to receive M parameter sets via high-layer signaling, where M>=1, M may be a positive integer, each parameter set may include quasi-co-location NZP CSI-RS indication information, and the quasi-co-location NZP CSI-RS indication information may be used by the terminal to acquire a large-scale characteristic of a channel. The first determination module may be configured to, when M=1, determine quasi-co-location CSI-RS information according to the quasi-co-location NZP CSI-RS indication information. The second determination module may be configured to, when M>1, receive parameter set selection information via physical-layer control signaling, and determine, according to the quasi-co-location NZP CSI-RS indication information and the parameter set selection information, quasi-co-location CSI-RS information of a DMRS in a subframe on which the physical-layer control signaling is sent.

A relationship determining device may include a third determination module, a fourth determination module and a fifth determination module.

The third determination module may determine a set of N quasi-co-location relationship types, where N>=1 and N is a positive integer. The fourth determination module may be configured to, when N=1, determine a quasi-co-location relationship between antenna ports according to the quasi-co-location relationship type. Alternatively, the fifth determination module may be configured to, when N>1, determine a set of quasi-co-location relationships between the antenna ports according to the N quasi-co-location relationship types and type indication signaling configured by high-layer signaling.

A computer-readable storage medium stores a computer-executable instruction, and the computer-executable instruction, when being executed by a processor, implements the information sending method, the information determining method and the relationship determining method.

According to the solutions of the embodiments of the present disclosure, the base station sends the M parameter sets via the high-layer signaling, where M>=1, M is a positive integer, each parameter set may include the quasi-co-location NZP CSI-RS indication information, and the quasi-co-location NZP CSI-RS indication information is used by the terminal to acquire the large-scale characteristic of the channel; and when M>1, the base station indicates, via a physical-layer control signaling, the parameter set selection information of the subframe on which the physical-layer control signaling is sent. By the solutions of some embodiments of the present disclosure, the terminal can determine CSI-RS configuration information according to the quasi-co-location NZP CSI-RS indication information, and can acquire the large-scale characteristic of the channel. The terminal may perform matching to obtain quasi-co-location information of current data according to the acquired large-scale characteristic of the channel. By virtue of the solution, the problem that a large-scale characteristic of a channel acquired by a terminal is inaccurate due to indefinite indication in quasi-co-location information notification signaling is solved, and an effect of improving channel estimation performance of the terminal is achieved.

BRIEF DESCRIPTION OF THE DRAWINGS

FIG. 1 is a schematic diagram illustrating the generation multiple virtual cells under the condition of different precoding reference signals;

FIG. 2 is a flowchart of an information sending method according to an embodiment of the present disclosure;

DETAILED DESCRIPTION OF THE EMBODIMENTS

Figure 3:
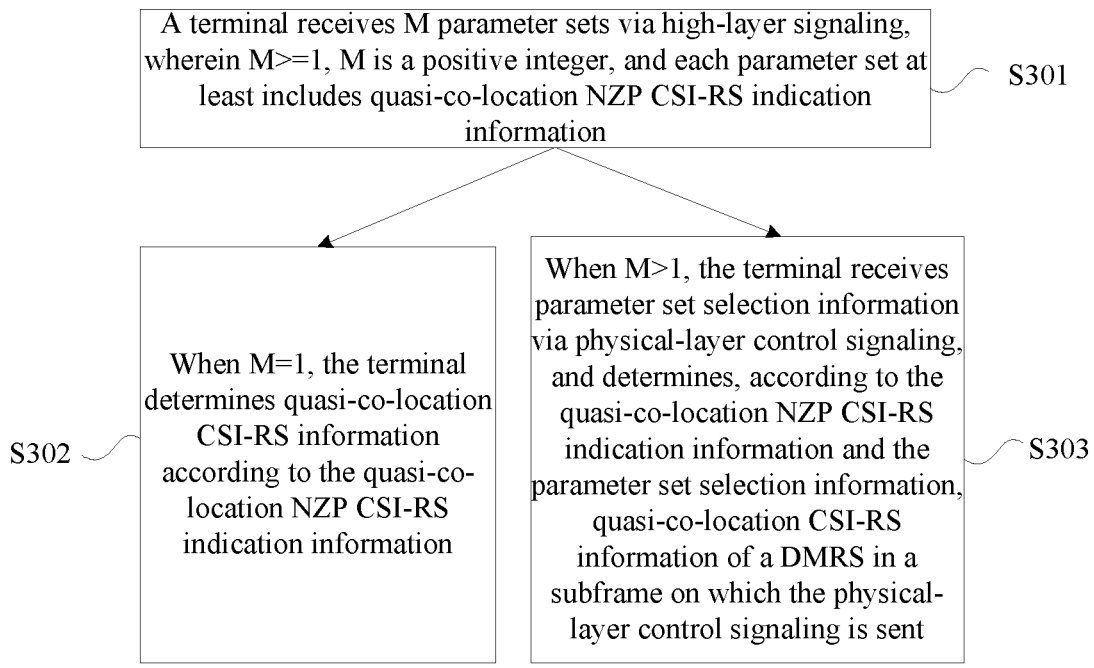
FIG. 3 is a flowchart of an information determining method according to an embodiment of the present disclosure.

The embodiments of the present disclosure will be described below in combination with the drawings in detail. The embodiments in the application and characteristics in the embodiments may be combined without conflicts.

It is important to note that terms "first", "second" and the like in the specification, claims and drawings of the present disclosure may be adopted not to describe a specific sequence or order but to distinguish similar objects.

The embodiments provide an information sending method. FIG. 2 is a flowchart of an information sending method according to an embodiment of the present disclosure. As shown in FIG. 2, the flow may include steps S201-S202.

In step S201, a base station sends M parameter sets via high-layer signaling, where M>=1, M is a positive integer, each parameter set may include quasi-co-location NZP CSI-RS indication information, and the quasi-co-location NZP CSI-RS indication information is used by a terminal to acquire a large-scale characteristic of a channel.

In step S202, when M>1, the base station indicates, via a physical-layer control signaling, parameter set selection information of a subframe on which the physical-layer control signaling is sent.

The large-scale characteristic of the channel in step S201 may refer to delay spread, Doppler spread, Doppler shift and average delay. By the steps, the terminal can perform matching to obtain quasi-co-location information of current data according to the acquired large-scale characteristic of the channel. By virtue of the solution, the problem that a large-scale characteristic of a channel acquired by a terminal is inaccurate due to indefinite indication in quasi-co-location information notification signaling is solved, and an effect of improving channel estimation performance of the terminal is achieved.

In an exemplary embodiment, the quasi-co-location NZP CSI-RS indication information in each parameter set may include indication information of one or more quasi-co-location NZP CSI-RS port groups. In the exemplary embodiment, since the one or more quasi-co-location NZP CSI-RS port groups correspond to one or more beams and NZP CSI-RSs of the one or more beams may be different, the terminal may be indicated to determine, according to the indication information of the quasi-co-location NZP CSI-RS port groups, quasi-co-location NZP CSI-RS configurations respectively corresponding to beams on different quasi-co-location NZP CSI-RS port groups.

In an exemplary embodiment, the one or more quasi-co-location NZP CSI-RS port groups correspond to the same set of NZP CSI-RS configuration. The set of NZP CSI-RS configuration refers to quasi-co-location NZP CSI-RS information configured in the related technology. In the exemplary embodiment, the terminal may be indicated to determine, according to different weights corresponding to the same set of NZP CSI-RS configuration, finally calculated quasi-co-location NZP CSI-RS configurations respectively corresponding to multiple beams on the one or more quasi-co-location NZP CSI-RS port groups.

In an exemplary embodiment, the quasi-co-location NZP CSI-RS indication information in each parameter set may include quasi-co-location CSI-RS time domain location indication information. In the exemplary embodiment, since different quasi-co-location NZP CSI-RS time domain locations correspond to one or more beams and NZP CSI-RSs of the one or more beams at different time domain locations may be different, the terminal may be indicated to determine, according to the quasi-co-location NZP CSI-RS time domain location indication information, quasi-co-location NZP CSI-RS configurations respectively corresponding to the beams at different quasi-co-location NZP CSI-RS time domain locations.

In an exemplary embodiment, the quasi-co-location CSI-RS time domain location indication information may include any one of offset information indication information and subframe set indication information.

In an exemplary embodiment, the quasi-co-location NZP CSI-RS indication information in each parameter set may include quasi-co-location CSI-RS frequency domain location indication information. In the exemplary embodiment, since different quasi-co-location NZP CSI-RS frequency domain locations correspond to one or more beams and NZP CSI-RSs of the one or more beams at different frequency domain locations may be different, the terminal may be indicated to determine, according to the quasi-co-location NZP CSI-RS frequency domain location indication information, quasi-co-location NZP CSI-RS configurations respectively corresponding to the beams at different quasi-co-location NZP CSI-RS frequency domain locations.

In an exemplary embodiment, the quasi-co-location CSI-RS frequency domain location indication information may include any one of RB set information and sub-band set information.

In an exemplary embodiment, each parameter set may include quasi-co-location NZP CSI-RS configuration indication information. The quasi-co-location NZP CSI-RS configuration indication information indicates Y sets of NZP CSI-RS configurations, Y>=2, and Y is a positive integer. In the exemplary embodiment, the parameter sets may not only indicate different weights corresponding to one set of NZP CSI-RS configuration but also indicate more than two sets of NZP CSI-RS configurations and weights corresponding to the more than two sets of NZP CSI-RS configurations.

In an exemplary embodiment, a DMRS port in the subframe and a CSI-RS port corresponding to the quasi-co-location NZP CSI-RS indication information may be quasi-co-located. In the exemplary embodiment, the terminal may determine a DMRS port which is quasi-co-located with a CSI-RS port where the current data is located to further improve channel estimation accuracy.

The information sending method is described above from a base station side. An information determining method of the embodiments of the present disclosure will be described below from a terminal side.

The embodiments of the present disclosure provide an information determining method. FIG. 3 is a flowchart of an information determining method according to an embodiment of the present disclosure. As shown in FIG. 3, the flow may include steps S301-S303.

In step S301, a terminal receives M parameter sets via high-layer signaling, where M>=1, M is a positive integer, each parameter set may include quasi-co-location NZP CSI-RS indication information, and the quasi-co-location NZP CSI-RS indication information is used by the terminal to acquire a large-scale characteristic of a channel.

In step S302, when M=1, the terminal determines quasi-co-location CSI-RS information according to the quasi-co-location NZP CSI-RS indication information.

In step S303, when M>1, the terminal receives parameter set selection information via physical-layer control signaling, and determines, according to the quasi-co-location NZP CSI-RS indication information and the parameter set selection information, quasi-co-location CSI-RS information of a DMRS in a subframe on which the physical-layer control signaling is sent.

By the steps, the terminal may perform matching to obtain quasi-co-location information of current data according to the acquired large-scale characteristic of the channel. By virtue of the solution, the problem that a large-scale characteristic of a channel acquired by a terminal is inaccurate due to indefinite indication in quasi-co-location information notification signaling is solved, and an effect of improving channel estimation performance of the terminal is achieved.

In an exemplary embodiment, the quasi-co-location NZP CSI-RS indication information in each parameter set may include indication information of one or more quasi-co-location NZP CSI-RS port groups. In the exemplary embodiment, the terminal determines, according to the indication information of the quasi-co-location NZP CSI-RS port groups, quasi-co-location NZP CSI-RS configurations respectively corresponding to beams on different quasi-co-location NZP CSI-RS port groups.

In an exemplary embodiment, the one or more quasi-co-location NZP CSI-RS port groups may correspond to the same set of NZP CSI-RS configuration. In the exemplary embodiment, the terminal determines, according to different weights corresponding to the same set of NZP CSI-RS configuration, finally calculated quasi-co-location NZP CSI-RS configurations respectively corresponding to multiple beams on the one or more quasi-co-location NZP CSI-RS port groups.

In an exemplary embodiment, the quasi-co-location NZP CSI-RS indication information in each parameter set may include quasi-co-location CSI-RS time domain location indication information. In the exemplary embodiment, the terminal determines, according to the quasi-co-location NZP CSI-RS time domain location indication information, quasi-co-location NZP CSI-RS configurations respectively corresponding to beams at different quasi-co-location NZP CSI-RS time domain locations.

In an exemplary embodiment, the quasi-co-location CSI-RS time domain location indication information may include any one of offset information indication information and subframe set indication information.

In an exemplary embodiment, the quasi-co-location NZP CSI-RS indication information in each parameter set may include quasi-co-location CSI-RS frequency domain location indication information. In the exemplary embodiment, the terminal may be indicated to determine, according to the quasi-co-location NZP CSI-RS frequency domain location indication information, quasi-co-location NZP CSI-RS configurations respectively corresponding to beams at different quasi-co-location NZP CSI-RS frequency domain locations.

In an exemplary embodiment, the quasi-co-location CSI-RS frequency domain location indication information may include any one of RB set information and sub-band set information.

In an exemplary embodiment, each parameter set may include quasi-co-location NZP CSI-RS configuration indication information. The quasi-co-location NZP CSI-RS configuration indication information indicates Y sets of quasi-co-location NZP CSI-RS configurations, where Y>=2, and Y is a positive integer. In the exemplary embodiment, the parameter sets may not only indicate different weights corresponding to one set of NZP CSI-RS configuration but also indicate more than two sets of NZP CSI-RS configurations and weights corresponding to the more than two sets of NZP CSI-RS configurations.

Figure 4:
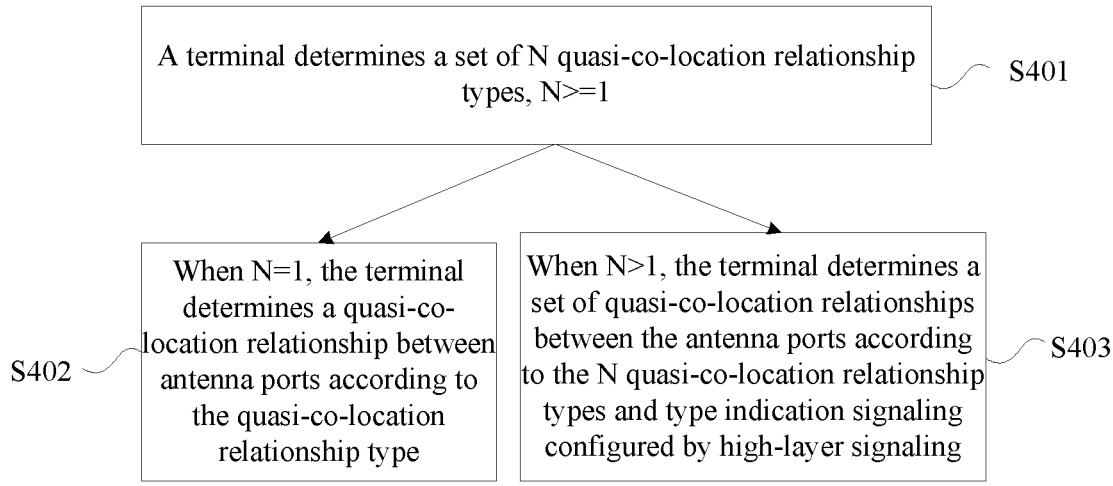
FIG. 4 is a flowchart of a relationship determining method according to an embodiment of the present disclosure.

Before or after the terminal determines the quasi-co-location CSI-RS information, The embodiments of the present disclosure also provide a relationship determining method. FIG. 4 is a flowchart of a relationship determining method according to an embodiment of the present disclosure. As shown in FIG. 4, the flow may include steps S401-S403.

In step S401, a terminal determines a set of N quasi-co-location relationship types, where N>=1 and N is a positive integer.

In step S402, when N=1, the terminal determines a quasi-co-location relationship between antenna ports according to the quasi-co-location relationship type.

In step S403, when N>1, the terminal determines a set of quasi-co-location relationships between the antenna ports according to the N quasi-co-location relationship types and type indication signaling configured by high-layer signaling.

In the exemplary embodiment, the terminal may determine the quasi-co-location relationship between the antenna ports according to a determined set of types of one or more quasi-co-location relationship, and the terminal obtains quasi-co-location information of current data. By virtue of the solution, the problem that a large-scale characteristic of a channel acquired by a terminal is inaccurate due to indefinite indication in quasi-co-location information notification signaling is solved, and an effect of improving channel estimation performance of the terminal is achieved.

In an exemplary embodiment, the terminal may determine the set of the N quasi-co-location relationship types according to a PMI enabling configuration parameter.

In an exemplary embodiment, the terminal may determine the set of the N quasi-co-location relationship types according to a measurement restriction configuration parameter.

In an exemplary embodiment, the N quasi-co-location relationship types may include a following type: the terminal may assume that dedicated DMRS ports 7-14 and CRS ports 0-3 indicated by quasi-co-location measurement reference signal configuration signaling of a base station are quasi-co-located.

From the above descriptions about implementation modes, those skilled in the art should clearly know that the methods according to the abovementioned embodiments may be implemented in a manner of combining software and a universal hardware platform. The methods may also be implemented through hardware. However, the former is a preferred implementation mode under many circumstances. Based on such an understanding, the technical solutions of the embodiments of the present disclosure substantially or parts making contributions to the related technology may be embodied in form of software product. The computer software product may be stored in a storage medium (for example, a Read-Only Memory (ROM)/Random Access Memory (RAM), a magnetic disk and an optical disk), including a plurality of instructions configured to enable a piece of terminal equipment (which may be a mobile phone, a computer, a server, network equipment or the like) to execute the methods of the embodiments of the present disclosure.

The embodiments also provide information sending, information determination and relationship determining devices. The devices are adopted to implement the abovementioned embodiments and exemplary implementation modes, and what has been described will not be elaborated. For example, term "module", used below, may be a combination of software and/or hardware capable of realizing a preset function. Although the devices described in the following embodiments are preferably implemented with software, implementation with hardware or a combination of the software and the hardware is also possible and conceivable.

Figure 5:
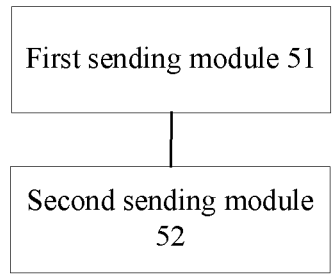
FIG. 5 is a structure block diagram of an information sending device according to an embodiment of the present disclosure.

FIG. 5 is a structure block diagram of an information sending device according to an embodiment of the present disclosure. As shown in FIG. 5, the device may include a first sending module 51 and a second sending module 52. The device will be described below.

The first sending module 51 is configured to send M parameter sets via high-layer signaling, where M>=1, M is a positive integer, each parameter set may include quasi-co-location NZP CSI-RS indication information, and the quasi-co-location NZP CSI-RS indication information is used by a terminal to acquire a large-scale characteristic of a channel. The second sending module 52 is coupled to the first sending module 51, and is configured to, when M>1, indicate, via a physical-layer control signaling, parameter set selection information of a subframe on which the physical-layer control signaling is sent.

Figure 6:
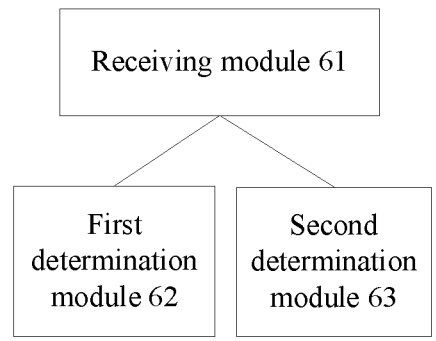
FIG. 6 is a structure block diagram of an information determining device according to an embodiment of the present disclosure.

FIG. 6 is a structure block diagram of an information determining device according to an embodiment of the present disclosure. As shown in FIG. 6, the device may include a receiving module 61, a first determination module 62 and a second determination module 63. The device will be described below.

The receiving module 61 is configured to receive M parameter sets via high-layer signaling, where M>=1, M is a positive integer, each parameter set may include quasi-co-location NZP CSI-RS indication information, and the quasi-co-location NZP CSI-RS indication information is used by the terminal to acquire a large-scale characteristic of a channel. The first determination module 62 is coupled to the receiving module 61, and is configured to, when M=1, determine quasi-co-location CSI-RS information according to the quasi-co-location NZP CSI-RS indication information. The second determination module 63 is coupled to the receiving module 61, and is configured to, when M>1, receive parameter set selection information via physical-layer control signaling, and determine, according to the quasi-co-location NZP CSI-RS indication information and the parameter set selection information, quasi-co-location CSI-RS information of a DMRS in a subframe on which the physical-layer control signaling is sent.

Figure 7:
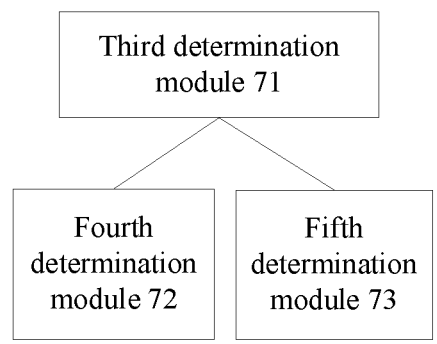
FIG. 7 is a structure block diagram of a relationship determining device according to an embodiment of the present disclosure.

FIG. 7 is a structure block diagram of a relationship determining device according to an embodiment of the present disclosure. As shown in FIG. 7, the device may include: a third determination module 71, a fourth determination module 72 and a fifth determination module 73. The device will be described below.

The third determination module 71 determines a set of N quasi-co-location relationship types, where N>=1 and N is a positive integer. The fourth determination module 72 is coupled to the third determination module 71, and is configured to, when N=1, determine a quasi-co-location relationship between antenna ports according to the quasi-co-location relationship type. The fifth determination module 73 is coupled to the third determination module 71, and is configured to, when N>1, determine a set of quasi-co-location relationships between the antenna ports according to the N quasi-co-location relationship types and type indication signaling configured by high-layer signaling.

It is important to note that each of the modules may be implemented through software or hardware, and the latter may be implemented in, but not limited to, the following manners. The modules may be all located in the same processor. Alternatively, the modules may be located in multiple processors respectively.

The information sending and determining methods and devices of the embodiments of the present disclosure will be described below in combination with specific implementation environments.

Embodiment 1

In the related technology, notification of quasi-co-location information may not distinguish different ports, different subframes and different sub-bands, therefore, the same quasi-co-location NZP CSI-RS configuration needs to be adopted for measurement when different beams are used for transmission. However, different beams practically have different channel characteristics (logical channel, a terminal may see the logical channel only). Therefore, such a method may bring influence to channel estimation performance and receiver performance. Moreover, when multiple beams are present in a cell, multiple virtual cells shown in FIG. 1 are formed. Under such a circumstance, related 2 bit indication signaling may not meet a requirement. Under part of conditions, selection of 16 or more beams may need to be supported. However, simple signaling extension is not a good method due to over high overhead.

For solving the problem that a large-scale characteristic of a channel acquired by a terminal is inaccurate due to indefinite indication in quasi-co-location information notification signaling, the embodiment of the present disclosure provides a quasi-co-location information indication method (i.e., the abovementioned information sending method). The method may include the following steps. A base station sends M parameter sets via high-layer signaling, where $M>=1$, M is a positive integer, and each parameter set may include a set of quasi-co-location NZP CSI-RS indication information. Moreover, when $M>1$, the base station further indicates, via physical-layer control signaling, parameter set selection information of a subframe on which the physical-layer control signaling is sent.

Figure 8:
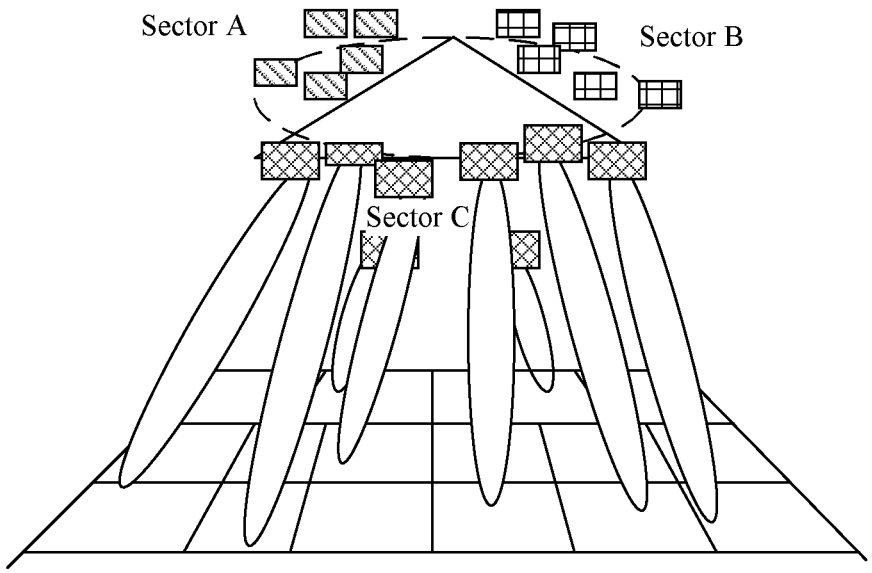
FIG. 8 is a schematic diagram illustrating the presence of precoding reference signals of multiple different beams in the same cell according to an embodiment of the present disclosure.

FIG. 8 is a schematic diagram illustrating the presence of precoding reference signals of multiple different beams in the same cell according to an embodiment of the present disclosure. As shown in FIG. 8, when precoding reference signals of multiple different beams are present in the same cell, if there exist $K=8$ beams and each beam corresponds to reference signals of a set of $L=2$ ports, L being an integer, the terminal measures $K=8$ reference signal port groups and selects a corresponding port group for Channel State Information (CSI) reporting.

Under such a circumstance, there exist two conditions.

A First Condition:

TABLE 6

Configuration Table when 8 × 2 Ports Belong to the same Set of NZP CSI-RS Configuration

| CSI-RS configuration | Port group | Beam |
| --- | --- | --- |
| Configuration 1 | 15, 16, | Beam1 |
|  | 17, 18 | Beam2 |
|  | 19, 20, | Beam3 |
|  | 21, 22 | Beam4 |
|  | 23, 24, | Beam5 |
|  | 25, 26 | Beam6 |
|  | 27, 28, | Beam7 |
|  | 29, 30 | Beam8 |

A Second Condition:

TABLE 7

Each Beam Corresponds to a Set of NZP CSI-RS

| CSI-RS configuration | Included port | Beam |
| --- | --- | --- |
| Configuration 1 | 15, 16, | Beam1 |
| Configuration 2 | 15, 16, | Beam2 |
| Configuration 3 | 15, 16, | Beam3 |

TABLE 7-continued

Each Beam Corresponds to a Set of NZP CSI-RS

| CSI-RS configuration | Included port | Beam |
| --- | --- | --- |
| Configuration 4 | 15, 16, | Beam4 |
| Configuration 5 | 15, 16, | Beam5 |
| Configuration 6 | 15, 16, | Beam6 |
| Configuration 7 | 15, 16, | Beam7 |
| Configuration 8 | 15, 16, | Beam8 |

For the first condition, notification of a related quasi-co-location indicator is associated with the whole set of NZP CSI-RS configuration, and different conditions of delay spread, Doppler spread, Doppler shift and average delay of ports included therein are not distinguished. In such a condition, if a related quasi-co-location NZP CSI-RS information notification mechanism is used, the problem of low accuracy may be caused, and performance may be influenced.

According to the embodiment of the present disclosure, a solution is provided: information of port groups is notified.

For example, when 8 Sets are configured, a configuration shown in Table 8 may be adopted.

TABLE 8

Indication of respective Configuration for 4 Beams under the Same Set of NZP CSI-RS Configuration Information

| Set index (ParameterSet Identifier (ID)) | Quasi-co-location NZP CSI-RS configuration ID (qcl-CSI-RS-ConfigNZPId) | Reference signal group id/reference signal resource id (Port Group/Resource id) | Port group |
| --- | --- | --- | --- |
| 0 | 1 | PortGroup/Resource 1 | 15, 16 |
| 1 | 1 | PortGroup/Resource 2 | 17, 18 |
| 2 | 1 | PortGroup/Resource 3 | 19, 20 |
| 3 | 1 | PortGroup/Resource 4 | 21, 22 |

In such a manner, 4 most possibly corresponding beams may be configured for User Equipment (UE), and then the beam can be dynamically selected through DCI. Different beams may be configured for different UE, and beams mentioned here refer to port groups. Compared with an original manner, such a manner may indicate information of a CSI-RS port group which is quasi-co-located with a DMRS of a current subframe more accurately, rather than all port information included in the whole NZP CRI-RS, and thus is more accurate.

When 4 Sets are configured, a configuration shown in Table 9 may alternatively be adopted. In this method, all 8 beams may be included.

TABLE 9

Indication of respective Configuration for 8 Beams under the Same Set of NZP CSI-RS Configuration Information

| Set index (Parameter Set ID) | Quasi-co-location NZP CSI-RS configuration ID (qcl-CSI-RS-ConfigNZPId) | Reference signal group id/reference signal resource id (Port Group/Resource id) | Port group |
| --- | --- | --- | --- |
| 0 | 1 | PortGroup/Resource 1&2 | 15, 16, 17, 18 |
| 1 | 1 | PortGroup/Resource 3&4 | 19, 20, 21, 22 |

TABLE 9-continued

Indication of respective Configuration for 8 Beams under
the Same Set of NZP CSI-RS Configuration Information

| Set index (Parameter Set ID) | Quasi-co-location NZP CSI-RS configuration ID (qcl-CSI-RS-ConfigNZPId) | Reference signal group id/reference signal resource id (Port Group/Resource id) | Port group |
|---|---|---|---|
| 2 | 1 | PortGroup/Resource 5&6 | 23, 24, 25, 26 |
| 3 | 1 | PortGroup/Resource 7&8 | 27, 28, 29, 30 |

For the second condition, according to the quasi-co-location indication method in Embodiment 1, the quasi-co-location indication information in the second condition may be extended to indicate more ports which are quasi-co-located with the current DMRS. When 4 Sets are configured, a configuration shown in Table 10 may alternatively be adopted. In Table 10, a set of quasi-co-location CSI-RS configuration indicated by each quasi-co-location NZP CSI-RS configuration ID may include one or more port groups.

TABLE 10

Configuration of Port Information of 8 Beams

| Set index (parameter Set ID) | Quasi-co-location NZP CSI-RS configuration ID (qcl-CSI-RS-ConfigNZPId) | Beam |
|---|---|---|
| 0 | 1&8 | Beam1&8 |
| 1 | 2&3 | Beam2&3 |
| 2 | 4&5 | Beam4&5 |
| 3 | 6&7 | Beam6&7 |

Embodiment 2

Figure 9:
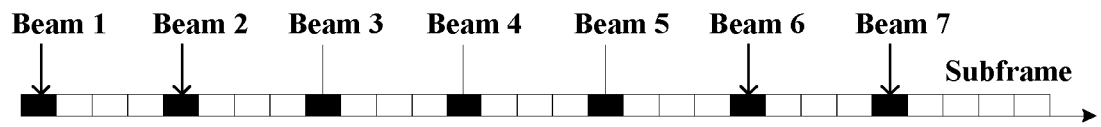
FIG. 9 is a first schematic diagram illustrating the implementation of CSI-RS reference signals of multiple beams according to an embodiment of the present disclosure.

FIG. 9 is a first schematic diagram illustrating the implementation of CSI-RS reference signals of multiple beams. As shown in FIG. 9, multiple precoding reference signals are supported in a relatively flexible manner by sending different beams at different subframe locations and triggering different channel quantified information feedback at different locations.

In the related technology, a set of periodic NZP CSI-RS configuration is notified, which is equivalent to that all subframes in FIG. 9 are considered to be quasi-co-located with a DMRS of a current data sending subframe. This may bring some problems. A solution is to add time domain location indication information, for example, subframe offset information and subframe set information, in each Set on the basis of an original quasi-co-location NZP CSI-RS configuration and perform selection according to Set selection signaling in DCI.

Table 11 is a mapping table of time domain location indication performed through the subframe offset information. As shown in Table 11, a subframe offset indication is added in an original parameter set.

TABLE 11

Time Domain Location Indication by
Adding Subframe Offset Information

| Set index (parameterSet ID) | Quasi-co-location NZP CSI-RS configuration ID (qcl-CSI-RS-ConfigNZPId) | Subframe offset |
|---|---|---|
| 0 | 1 | Last sending subframe of CSI-RS with ConfigNZPId = 1 |
| 1 | 1 | Second last sending subframe location of CSI-RS with ConfigNZPId = 1 |
| 2 | 1 | Third last sending subframe location of CSI-RS with ConfigNZPId = 1 |
| 3 | 1 | Fourth last sending subframe location of CSI-RS with ConfigNZPId = 1 |

Figure 10:
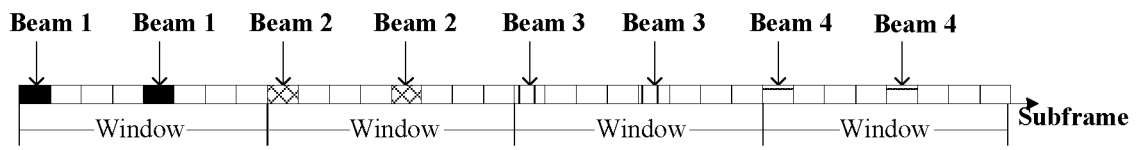
FIG. 10 is a second schematic diagram illustrating the implementation of CSI-RS reference signals of multiple beams according to an embodiment of the present disclosure.

FIG. 10 is a second schematic diagram illustrating the implementation of CSI-RS reference signals of multiple beams. As shown in FIG. 10, multiple windows are defined, precoding weights of CSI-RSs in the same window are kept unchanged, while precoding weights of different windows may be changed.

For avoiding the condition that all subframes in FIG. 10 are quasi-co-located with a DMRS of a current data sending subframe, another solution is to add a window offset indication in an original parameter set. Table 12 is a mapping table of time domain location indication performed through the window offset information.

TABLE 12

Time Domain Location Indication by Adding Window Offset Information

| Set index (parameterSet ID) | Quasi-co-location NZP CSI-RS configuration ID (qcl-CSI-RS-ConfigNZPId) | Window indication information |
|---|---|---|
| 0 | 1 | Current window |
| 1 | 1 | First window before the current window |
| 2 | 1 | Second window before the current window |
| 3 | 1 | Third window before the current window |

Figure 11:
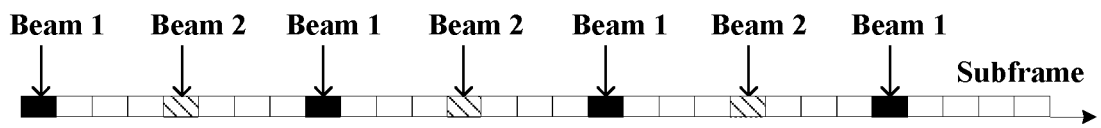
FIG. 11 is a third schematic diagram illustrating the implementation of CSI-RS reference signals of multiple beams according to an embodiment of the present disclosure.

FIG. 11 is a third schematic diagram illustrating the implementation of CSI-RS reference signals of multiple beams. As shown in FIG. 11, precoding weights on a time domain may be rolled.

Similarly, for avoiding the condition that all subframes in FIG. 11 are quasi-co-located with a MDRS of a current data sending subframe, a solution is to adopt the following Table 13. Table 13 is a mapping table of time domain location indication performed by adding subframe set information. As shown in Table 13, the subframe set information is added in each Set on the basis of the original quasi-co-location NZP CSI-RS configuration, and selection is performed according to the Set selection signaling in the DCI.

TABLE 13

Time Domain Location Indication by Adding Subframe Set Information

| Set index (parameterSet ID) | Quasi-co-location NZP CSI-RS configuration ID (qcl-CSI-RS-ConfigNZPId) | Time domain subframe Group |
|---|---|---|
| 0 | 1 | Subframe group 1 |
| 1 | 1 | Subframe group 2 |
| 2 | 2 | Subframe group 1 |
| 3 | 2 | Subframe group 2 |

Embodiment 3

Figure 12:
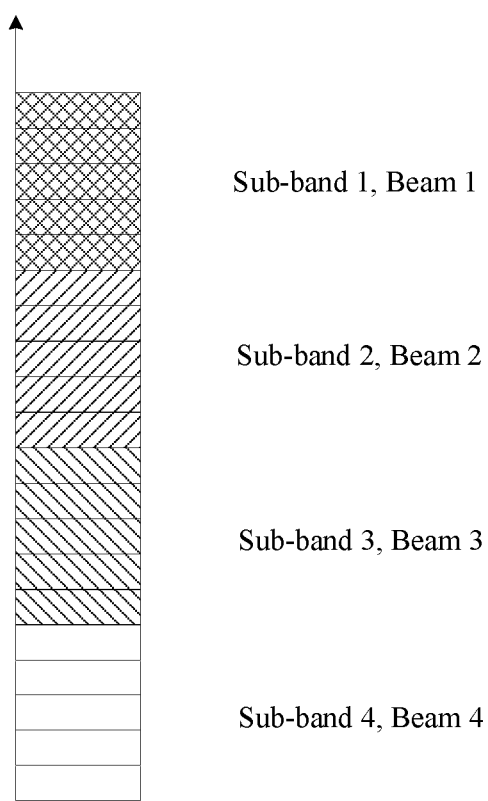
FIG. 12 is a schematic diagram illustrating a situation in which different beams are at different sub-band locations according to an embodiment of the present disclosure.

When a relatively large system bandwidth is configured, precoding reference signals used at different frequency domain locations may be changed. FIG. 12 is a schematic diagram illustrating a situation in which different beams are at different sub-band locations. In the related technology, a set of periodic NZP CSI-RS configuration is notified, which is equivalent to that CSI-RSs sent by all RBs/sub-bands in FIG. 12 are considered to be quasi-co-located with a DMRS of a current data sending subframe. Such an understanding is inaccurate. A solution is to add frequency domain location indication information in each Set on the basis of an original quasi-co-location NZP CSI-RS configuration and perform selection according to Set selection signaling in DCI.

According to Table 14, sub-band locations are notified for frequency domain location indication, and furthermore, different sub-band locations correspond to different weights. Although CSI-RS configuration IDs of sub-bands 1, 2, 3 and 4 are all 1, each sub-band has a different weight. Therefore, different CSI-RS information configuration may be performed for different sub-band locations.

TABLE 14

Frequency Domain Location Indication by Notifying Sub-band Locations

| Set index (parameterSet ID) | Quasi-co-location NZP CSI-RS configuration ID (qcl-CSI-RS-ConfigNZPId) | Sub-band location |
|---|---|---|
| 0 | 1 | Sub-band 1 |
| 1 | 1 | Sub-band 2 |
| 2 | 1 | Sub-band 3 |
| 3 | 1 | Sub-band 4 |

According to Table 15, RB locations are notified for frequency domain location indication, and furthermore, different RB locations correspond to different weights. Although CSI-RS configuration IDs of RBs 1-50 are all 1, each RB location has a different weight. Therefore, different CSI-RS information configuration may be performed for different RB locations.

TABLE 15

Frequency Domain Location Indication by Notifying RB Locations

| Set index (parameterSet ID) | Quasi-co-location NZP CSI-RS configuration ID (qcl-CSI-RS-ConfigNZPId) | RB location |
|---|---|---|
| 0 | 1 | RB1~12 |
| 1 | 1 | RB13~24 |

TABLE 15-continued

Frequency Domain Location Indication by Notifying RB Locations

| Set index (parameterSet ID) | Quasi-co-location NZP CSI-RS configuration ID (qcl-CSI-RS-ConfigNZPId) | RB location |
|---|---|---|
| 2 | 1 | RB25~36 |
| 3 | 1 | RB36~50 |

Embodiment 4

For acquiring current quasi-co-location CSI-RS information, a terminal side receives high-layer configuration signaling sent by a base station at first. The high-layer configuration signaling sent by the base station may include 4 parameter sets, each parameter set may include content information of the following Table 16, Table 17 or Table 18, and the information may be bound with an RE mapping indication parameter.

TABLE 16

Precoding Reference signal Configuration Table of Different Ports under the Same Set of CSI-RS Configuration

| Set index (parameterSet ID) | Quasi-co-location NZP CSI-RS configuration ID (qcl-CSI-RS-ConfigNZPId) | Reference signal group id/reference signal resource id (Port Group/Resourceid) | Port group |
|---|---|---|---|
| 0 | 1 | Port Group/Resource 1 | 15, 16 |
| 1 | 1 | Port Group/Resource 2 | 17, 18 |
| 2 | 1 | Port Group/Resource 3 | 19, 20 |
| 3 | 1 | Port Group/Resource 4 | 21, 22 |

TABLE 17

Precoding Reference signal Configuration Table of Different Ports under two Sets of CSI-RS Configurations

| Set index (parameterSet ID) | Quasi-co-location NZP CSI-RS configuration ID (qcl-CSI-RS-ConfigNZPId) | Reference signal group id/reference signal resource id (Port Group/Resource id) | Port group |
|---|---|---|---|
| 0 | 1 | Port Group/Resource 1 | 15, 16 |
| 1 | 1 | Port Group/Resource 2 | 17, 18 |
| 2 | 2 | Port Group/Resource 3 | 19, 20 |
| 3 | 2 | Port Group/Resource 4 | 21, 22 |

TABLE 18

The Same Port Corresponds to a Set of CSI-RS Configuration respectively

| Set index (parameterSet ID) | Quasi-co-location NZP CSI-RS configuration ID (qcl-CSI-RS-ConfigNZPId) | Reference signal group id/reference signal resource id (Port Group/Resource id) | Port group |
|---|---|---|---|
| 0 | 1 | Port Group/Resource 4 | 21, 22 |
| 1 | 2 | Port Group/Resource 4 | 21, 22 |
| 2 | 3 | Port Group/Resource 4 | 21, 22 |
| 3 | 4 | Port Group/Resource 4 | 21, 22 |

A terminal may acquire one or more sets of quasi-co-location reference signal configurations through Table 16, Table 17 or Table 18, and may learn about configuration information of specific port groups in the reference signal configurations.

The terminal receives DCI related to downlink scheduling in downlink physical-layer control signaling on a subframe with scheduled downlink data, obtains Set selection indication information, and determines a parameterSet ID corresponding to the subframe where the terminal is located at present. The terminal determines a quasi-co-location CSI-RS port group of a current DMRS according to the parameterSet ID.

After acquiring the CSI-RS port group, the terminal measures a large-scale channel characteristic such as delay spread, Doppler spread, Doppler shift and average delay on the basis of included CSI-RS ports; and after delay spread, Doppler spread, Doppler shift and average delay information is measured, under a condition in which the DMRS is also considered to have approximate delay spread, Doppler spread, Doppler shift and average delay with the CSI-RS ports, the terminal considers that the CSI-RS port group and the DMRS are quasi-co-located, and determines CSI-RS information corresponding to the CSI-RS port group. The large-scale channel characteristic is acquired to improve channel estimation and data receiving performance.

Embodiment 5

For acquiring current quasi-co-location CSI-RS information, a terminal side receives high-layer configuration signaling sent by a base station at first. The high-layer configuration signaling sent by the base station may include 4 parameter sets, each parameter set may include each piece of information shown in Table 19, and the information may be bound with an RE mapping indication parameter.

TABLE 19

Configuration Relationship Table of Different Port groups of 8 Beams

| Set index (parameterSet ID) | Quasi-co-location NZP CSI-RS configuration ID (qcl-CSI-RS-ConfigNZPId) | Beam |
|---|---|---|
| 0 | 1&8 | Beam1&8 |
| 1 | 2&3 | Beam2&3 |
| 2 | 4&5 | Beam4&5 |
| 3 | 6&7 | Beam6&7 |

Table 19 includes IDs of 8 sets of quasi-co-location reference signal configurations, and a terminal may learn about more than one set of quasi-co-location reference signal configuration through Table 19.

The terminal receives DCI related to downlink scheduling in downlink physical-layer control signaling on a subframe with scheduled downlink data, obtains Set selection indication information, determines a parameterSet ID according to the subframe where the terminal is located at present, and determines multiple sets of quasi-co-location CSI-RS reference signals of a current DMRS according to the parameterSet ID.

After acquiring multiple sets of CSI-RS port groups, the terminal measures large-scale channel characteristics such as delay spread, Doppler spread, Doppler shift and average delay on the basis of included CSI-RS ports respectively; the terminal performs averaging processing on measurement results of the multiple sets of reference signals; after measuring reference signal measurement information by averaging processing, the terminal determines that delay spread, Doppler spread, Doppler shift and average delay corresponding to the DMRS are approximate to average delay spread, Doppler spread, Doppler shift and average delay of the multiple sets of CSI-RS configurations; and the terminal determines an average value of the measured large-scale channel characteristics corresponding to the multiple sets of reference signals, and uses it for channel estimation and data receiving.

Embodiment 6

For acquiring current quasi-co-location CSI-RS information, a terminal side receives high-layer configuration signaling sent by a base station at first. The high-layer configuration signaling sent by the base station may include 4 parameter sets, each parameter set may include information shown in Table 20 or Table 21, and the information may be bound with an RE mapping indication parameter.

TABLE 20

Precoding Reference signal Information Corresponding to Different Subframe Locations under the Same Set of CSI-RS Configuration respectively

| Set index (parameterSet ID) | Quasi-co-location NZP CSI-RS configuration ID (qcl-CSI-RS-ConfigNZPId) | Subframe offset |
|---|---|---|
| 0 | 1 | Last sending Subframe of CSI-RS with ConfigNZPId = 1 |
| 1 | 1 | Second last sending subframe location of CSI-RS with ConfigNZPId = 1 |
| 2 | 1 | Third last sending subframe location of CSI-RS with ConfigNZPId = 1 |
| 3 | 1 | Fourth last sending subframe location of CSI-RS with ConfigNZPId = 1 |

TABLE 21

Precoding Reference signal Information Corresponding to Different Subframe Locations under two Sets of CSI-RS Configurations respectively

| Set index (parameterSet ID) | Quasi-co-location NZP CSI-RS configuration ID (qcl-CSI-RS-ConfigNZPId) | Subframe offset |
|---|---|---|
| 0 | 1 | Last sending Subframe of CSI-RS with ConfigNZPId = 1 |
| 1 | 1 | Second last sending subframe location of CSI-RS with ConfigNZPId = 1 |
| 2 | 2 | Third last sending subframe location of CSI-RS with ConfigNZPId = 1 |
| 3 | 2 | Fourth last sending subframe location of CSI-RS with ConfigNZPId = 1 |

A terminal may learn about one or more sets of quasi-co-location reference signal configurations through Table 20 or Table 21, and may learn about configuration information of specific subframe locations in the reference signal configurations.

The terminal receives DCI related to downlink scheduling in downlink physical-layer control signaling on a subframe with scheduled downlink data, obtains Set selection indication information, and determines a parameterSet ID according to the subframe where the terminal is located at present. The terminal determines a quasi-co-location CSI-RS subframe location of a current DMRS according to the parameterSet ID.

After acquiring the CSI-RS subframe location, the terminal measures delay spread, Doppler spread, Doppler shift and average delay on the basis of an included CSI-RS subframe; after measuring the information, the terminal considers that the DMRS also has approximate delay spread, Doppler spread, Doppler shift and average delay with a CSI-RS port at the subframe (time domain) location; and the terminal confirms that precoding reference signal information corresponding to the CSI-RS subframe location and the DMRS are quasi-co-located, and uses the precoding reference signal information corresponding to the CSI-RS subframe location for channel estimation and data receiving.

Embodiment 7

For acquiring current quasi-co-location CSI-RS information, a terminal side receives high-layer configuration signaling sent by a base station at first. The high-layer configuration signaling sent by the base station may include 4 parameter sets, each parameter set may include information shown in Table 22 or Table 23, and the information may be bound with an RE mapping indication parameter.

TABLE 22

Precoding Reference signal Indication Relationship Table of Different Corresponding Window Locations under the Same Set of CSI-RS Configuration

| Set index (parameterSet ID) | Quasi-co-location NZP CSI-RS configuration ID (qcl-CSI-RS-ConfigNZPId) | Window indication information |
|---|---|---|
| 0 | 1 | Current window |
| 1 | 1 | First window before the current window |
| 2 | 1 | Second window before the current window |
| 3 | 1 | Third window before the current window |

TABLE 22

Precoding Reference signal Indication Relationship Table of Different Corresponding Window Locations under two Sets of CSI-RS Configurations

| Set index (parameterSet ID) | Quasi-co-location NZP CSI-RS configuration ID (qcl-CSI-RS-ConfigNZPId) | Window indication information |
|---|---|---|
| 0 | 1 | Current window |
| 1 | 1 | First window before the current window |
| 2 | 2 | Second window before the current window |
| 3 | 2 | Third window before the current window |

A terminal may learn about one or more sets of quasi-co-location reference signal configurations through Table 22 or Table 23, and may learn about configuration information of specific subframe locations in the reference signal configurations.

The terminal receives DCI related to downlink scheduling in downlink physical-layer control signaling on a subframe with scheduled downlink data, obtains Set selection indication information, and determines a parameterSet ID according to the subframe where the terminal is located at present. The terminal determines a quasi-co-location CSI-RS subframe location (CSI-RS subframe included in an indicated window) of a current DMRS according to the parameterSet ID.

After acquiring the CSI-RS subframe location, the terminal measures delay spread, Doppler spread, Doppler shift and average delay on the basis of an included CSI-RS subframe; after measuring the information, the terminal considers that the DMRS also has approximate delay spread, Doppler spread, Doppler shift and average delay with a CSI-RS port at the subframe (time domain) location; and the terminal confirms that precoding reference signal information corresponding to the CSI-RS subframe location and the DMRS are quasi-co-located, and uses the precoding reference signal information corresponding to the CSI-RS subframe location for channel estimation and data receiving.

Embodiment 8

For acquiring current quasi-co-location CSI-RS information, a terminal side receives high-layer configuration signaling sent by a base station at first. The high-layer configuration signaling sent by the base station may include 4 parameter sets, each parameter set may include information shown in Table 24, and the information may be bound with an RE mapping indication parameter.

TABLE 24

Different Subframe Groups under the Time Domain Corresponding to two Sets of CSI-RS Configurations

| Set index (parameterSet ID) | Quasi-co-location NZP CSI-RS configuration ID (qcl-CSI-RS-ConfigNZPId) | Time domain subframe group |
|---|---|---|
| 0 | 1 | Subframe group 1 |
| 1 | 1 | Subframe group 2 |
| 2 | 2 | Subframe group 1 |
| 3 | 2 | Subframe group 2 |

A terminal may learn about one or more sets of quasi-co-location reference signal configurations through Table 24, and may learn about configuration information of specific subframe locations in the reference signal configurations.

The terminal receives DCI related to downlink scheduling in downlink physical-layer control signaling on a subframe with scheduled downlink data, obtains Set selection indication information, and determines a parameterSet ID according to the subframe where the terminal is located at present. The terminal determines a quasi-co-location CSI-RS subframe location (subframe included in an indicated subframe group) of a current DMRS according to the parameterSet ID.

After acquiring the CSI-RS subframe location, the terminal measures delay spread, Doppler spread, Doppler shift and average delay on the basis of an included CSI-RS subframe; after measuring the information, the terminal considers that the DMRS also has approximate delay spread, Doppler spread, Doppler shift and average delay with a CSI-RS port at the subframe (time domain) location; and the terminal confirms that precoding reference signal information corresponding to the CSI-RS subframe location and the DMRS are quasi-co-located, and uses the precoding reference signal information corresponding to the CSI-RS subframe location for channel estimation and data receiving.

Embodiment 9

For acquiring current quasi-co-location CSI-RS information, a terminal side receives high-layer configuration signaling sent by a base station at first. The high-layer configuration signaling sent by the base station may include 4 parameter sets, each parameter set may include information shown in Table 25 or Table 26, and the information may be bound with an RE mapping indication parameter.

TABLE 25

Sub-band Location Indication Added in the Original Parameter Set under two Sets of CSI-RS configurations

| Set index (parameterSet ID) | Quasi-co-location NZP CSI-RS configuration ID (qcl-CSI-RS-ConfigNZPId) | Sub-band location |
|---|---|---|
| 0 | 1 | Sub-band 1 |
| 1 | 1 | Sub-band 2 |
| 2 | 2 | Sub-band 3 |
| 3 | 2 | Sub-band 4 |

TABLE 26

RB Set Indication Added in the Original Parameter Set under the Same Set of CSI-RS configuration

| Set index (parameterSet ID) | Quasi-co-location NZP CSI-RS configuration ID (qcl-CSI-RS-ConfigNZPId) | RB location |
|---|---|---|
| 0 | 1 | RB1~12 |
| 1 | 1 | RB13~24 |
| 2 | 1 | RB25~36 |
| 3 | 1 | RB36~50 |

A terminal may learn about one or more sets of quasi-co-location reference signal configurations through Table 25 or Table 26, and may learn about configuration information of specific frequency domain locations in the reference signal configurations.

The terminal receives DCI related to downlink scheduling in downlink physical-layer control signaling on a subframe with scheduled downlink data, obtains Set selection indication information, and determines a parameterSet ID according to the subframe where the terminal is located at present. The terminal determines a quasi-co-location CSI-RS frequency domain location (RB set or sub-band) of a current DMRS according to the parameterSet ID.

After acquiring the CSI-RS frequency domain location, the terminal measures delay spread, Doppler spread, Doppler shift and average delay on the basis of an included CSI-RS frequency domain included at the location; after measuring the information, the terminal considers that the DMRS also has approximate delay spread, Doppler spread, Doppler shift and average delay with a CSI-RS port at the frequency domain location; and the terminal confirms that precoding reference signal information corresponding to the CSI-RS frequency domain location and the DMRS are quasi-co-located, and uses the precoding reference signal information corresponding to the CSI-RS frequency domain location for channel estimation and data receiving.

Embodiment 10

For a downlink transmission mode, for example, a transmission mode 10 defined in LTE-A, a base station and a terminal may assume that there exist multiple types of quasi-co-location relationships, which may include, for example, the following three types.

A first type: the terminal may assume that CRS ports 0-3, dedicated DMRS ports 7-14 and channel measurement reference signal ports 15-22 are quasi-co-located.

A second type: the terminal may assume that the dedicated DMRS ports 7-14 and the channel measurement reference signal ports 15-22 indicated by quasi-co-location measurement reference signal configuration signaling of the base station are quasi-co-located.

A third type: the terminal may assume that the dedicated DMRS ports 7-14 and the CRS ports 0-3 indicated by the quasi-co-location measurement reference signal configuration signaling of the base station are quasi-co-located.

Here, the second type and the second type both require the base station to configure some quasi-co-location measurement reference signals through the quasi-co-location measurement reference signal configuration signaling; and the quasi-co-location CRS ports are configured in the second type, and quasi-co-location CSI-RS ports are configured in the second type.

There may also be only two types, that is, only the second type and the third type are included.

The second type: the terminal may assume that the dedicated DMRS ports 7-14 and the channel measurement reference signal ports 15-22 indicated by the quasi-co-location measurement reference signal configuration signaling of the base station are quasi-co-located.

The third type: the terminal may assume that the dedicated DMRS ports 7-14 and the CRS ports 0-3 indicated by the quasi-co-location measurement reference signal configuration signaling of the base station are quasi-co-located.

The terminal may determine the types of the quasi-co-location relationships according to a PMI enabling parameter configuration during feedback. For example, when PMI reporting of all processes is disabled, the terminal may assume that the dedicated DMRS ports 7-14 and the CRS ports 0-3 indicated by the quasi-co-location measurement reference signal configuration signaling of the base station are quasi-co-located. When a PMI of at least one CSI process is enabled, the terminal may assume that the dedicated DMRS ports 7-14 and the channel measurement reference signal ports 15-22 indicated by the quasi-co-location measurement reference signal configuration signaling of the base station are quasi-co-located.

Embodiment 11

For a downlink transmission mode, for example, a transmission mode 10 defined in LTE-A, a base station and a terminal may assume that there exist multiple types of quasi-co-location relationships, which may include, for example, the following three types.

A first type: the terminal may assume that CRS ports 0-3, dedicated DMRS ports 7-14 and channel measurement reference signal ports 15-22 are quasi-co-located.

A second type: the terminal may assume that the dedicated DMRS ports 7-14 and the channel measurement reference signal ports 15-22 indicated by quasi-co-location measurement reference signal configuration signaling of the base station are quasi-co-located.

A third type: the terminal may assume that the dedicated DMRS ports 7-14 and the CRS ports 0-3 indicated by the quasi-co-location measurement reference signal configuration signaling of the base station are quasi-co-located.

Here, the second type and the second type both require the base station to configure some quasi-co-location measurement reference signals through the quasi-co-location measurement reference signal configuration signaling; and the quasi-co-location CRS ports are configured in the second type, and quasi-co-location CSI-RS ports are configured in the second type.

The terminal may determine a set of the types of the quasi-co-location relationships according to a PMI enabling parameter configuration during feedback. For example, when PMI reporting of all processes is disabled, one type in the following set may be configured:

the first type, the terminal may assume that the CRS ports 0-3, the dedicated DMRS ports 7-14 and the channel measurement reference signal ports 15-22 are quasi-co-located; and the third type: the terminal may assume that the dedicated DMRS ports 7-14 and the CRS ports 0-3 indicated by the quasi-co-location measurement reference signal configuration signaling of the base station are quasi-co-located.

When PMI reporting of at least one CSI process is enabled, any one type in the following set may be configured:

the second type: the terminal may assume that the dedicated DMRS ports 7-14 and the channel measurement reference signal ports 15-22 indicated by the quasi-co-location measurement reference signal configuration signaling of the base station are quasi-co-located; and the third type: the terminal may assume that the dedicated DMRS ports 7-14 and the CRS ports 0-3 indicated by the quasi-co-location measurement reference signal configuration signaling of the base station are quasi-co-located.

The base station configures the types of the quasi-co-location relationships through 1 bit signaling.

Embodiment 12

For a downlink transmission mode, for example, a transmission mode 10 defined in LTE-A, a base station and a terminal may assume that there exist multiple types of quasi-co-location relationships, which may include, for example, the following three types.

A first type: the terminal may assume that CRS ports 0-3, dedicated DMRS ports 7-14 and channel measurement reference signal ports 15-22 are quasi-co-located.

A second type: the terminal may assume that the dedicated DMRS ports 7-14 and the channel measurement reference signal ports 15-22 indicated by quasi-co-location measurement reference signal configuration signaling of the base station are quasi-co-located.

A third type: the terminal may assume that the dedicated DMRS ports 7-14 and the CRS ports 0-3 indicated by the quasi-co-location measurement reference signal configuration signaling of the base station are quasi-co-located.

Here, the second type and the second type both require the base station to configure some quasi-co-location measurement reference signals through the quasi-co-location measurement reference signal configuration signaling; and the quasi-co-location CRS ports are configured in the second type, and quasi-co-location CSI-RS ports are configured in the second type.

There may also be only two types.

The second type: the terminal may assume that the dedicated DMRS ports 7-14 and the channel measurement reference signal ports 15-22 indicated by the quasi-co-location measurement reference signal configuration signaling of the base station are quasi-co-located.

The third type: the terminal may assume that the dedicated DMRS ports 7-14 and the CRS ports 0-3 indicated by the quasi-co-location measurement reference signal configuration signaling of the base station are quasi-co-located.

The terminal may determine the types of the quasi-co-location relationships according to a CSI-RS measurement restriction. For example, when CSI-RS measurement restriction of one of all processes is enabled, the terminal may assume that the dedicated DMRS ports 7-14 and the CRS ports 0-3 indicated by the quasi-co-location measurement reference signal configuration signaling of the base station are quasi-co-located. When CSI-RS measurement restriction of all the CSI processes is disabled, the terminal may assume that the dedicated DMRS ports 7-14 and the channel measurement reference signal ports 15-22 indicated by the quasi-co-location measurement reference signal configuration signaling of the base station are quasi-co-located.

Embodiment 13

For a downlink transmission mode, for example, a transmission mode 10 defined in LTE-A, a base station and a terminal may assume that there exist multiple types of quasi-co-location relationships, which may include, for example, the following three types.

A first type: the terminal may assume that CRS ports 0-3, dedicated DMRS ports 7-14 and channel measurement reference signal ports 15-22 are quasi-co-located.

A second type: the terminal may assume that the dedicated DMRS ports 7-14 and the channel measurement reference signal ports 15-22 indicated by quasi-co-location measurement reference signal configuration signaling of the base station are quasi-co-located.

A third type: the terminal may assume that the dedicated DMRS ports 7-14 and the CRS ports 0-3 indicated by the quasi-co-location measurement reference signal configuration signaling of the base station are quasi-co-located.

Here, the second type and the second type both require the base station to configure some quasi-co-location measurement reference signals through the quasi-co-location measurement reference signal configuration signaling; and the quasi-co-location CRS ports are configured in the second type, and quasi-co-location CSI-RS ports are configured in the second type.

The terminal may determine a set of the types of the quasi-co-location relationships according to a CSI-RS measurement restriction configuration. For example, when CSI-RS measurement restriction of one CSI process is enabled, one type in the following set may be configured:

the first type, the terminal may assume that the CRS ports 0-3, the dedicated DMRS ports 7-14 and the channel measurement reference signal ports 15-22 are quasi-co-located; and the third type: the terminal may assume that the dedicated DMRS ports 7-14 and the CRS ports 0-3 indicated by the quasi-co-location measurement reference signal configuration signaling of the base station are quasi-co-located.

When CSI-RS measurement restriction of all the CSI processes is disabled, any one type in the following set may be configured:

the second type: the terminal may assume that the dedicated DMRS ports 7-14 and the channel measurement reference signal ports 15-22 indicated by the quasi-co-location measurement reference signal configuration signaling of the base station are quasi-co-located; and the third type: the terminal may assume that the dedicated DMRS ports 7-14 and the CRS ports 0-3 indicated by the quasi-co-location measurement reference signal configuration signaling of the base station are quasi-co-located.

The base station configures the types of the quasi-co-location relationships through 1 bit signaling.

A computer-readable storage medium stores a computer-executable instruction. The computer-executable instruction, when being executed by a processor, implements the information sending method, the information determining method and the relationship determining method.

The embodiments of the present disclosure also provide a storage medium. In the exemplary embodiment, the storage medium may be configured to store program codes S11-S12 configured to execute the following steps.

Based on program code S11, a base station sends M parameter sets via high-layer signaling, where M>=1, M is a positive integer, each parameter set may include quasi-co-location NZP CSI-RS indication information, and the quasi-co-location NZP CSI-RS indication information is used by a terminal to acquire a large-scale characteristic of a channel.

Based on program code S12, when M>1, the base station indicates, via a physical-layer control signaling, parameter set selection information of a subframe on which the physical-layer control signaling is sent.

In an exemplary embodiment, the storage medium is further configured to store program codes S21-S23 configured to execute the following steps.

Based on program code S21, a terminal receives M parameter sets via high-layer signaling, where M>=1, M is a positive integer, each parameter set may include quasi-co-location NZP CSI-RS indication information, and the quasi-co-location NZP CSI-RS indication information is used by the terminal to acquire a large-scale characteristic of a channel.

Based on program code S22, when M=1, the terminal determines quasi-co-location CSI-RS information according to the quasi-co-location NZP CSI-RS indication information.

Based on program code S23, when M>1, the terminal receives parameter set selection information via physical-layer control signaling, and determines, according to the quasi-co-location NZP CSI-RS indication information and the parameter set selection information, quasi-co-location CSI-RS information of a DMRS in a subframe on which the physical-layer control signaling is sent.

In the exemplary embodiment, a processor executes execution codes S31-S33 of the following steps according to the program codes which have been stored in the storage medium.

Based on program code S31, a terminal determines a set of N quasi-co-location relationship types, where N>=1 and N is a positive integer.

Based on program code S32, when N=1, the terminal determines a quasi-co-location relationship between antenna ports according to the quasi-co-location relationship type.

Based on program code S33, when N>1, the terminal determines a set of quasi-co-location relationships between the antenna ports according to the N quasi-co-location relationship types and type indication signaling configured by high-layer signaling.

In the exemplary embodiment, the storage medium may include, but is not limited to: various media capable of storing program codes such as a U disk, a ROM, a RAM, a mobile hard disk, a magnetic disk or an optical disk.

Optionally, examples in the embodiment may refer to the examples described in the abovementioned embodiments and exemplary implementation modes, and will not be elaborated in the embodiment.

Obviously, those skilled in the art should know that each module or each step of the embodiments of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the embodiments of the present disclosure are not limited to any specific hardware and software combination.

The above is only the exemplary embodiment of the present disclosure and not intended to limit the embodiments of the present disclosure. For those skilled in the art, the embodiments of the present disclosure may have various modifications and variations. Any modifications, equivalent replacements, improvements and the like made within the principle of the embodiments of the present disclosure shall fall within the scope of protection of the claims of the present disclosure.

INDUSTRIAL APPLICABILITY

By the solutions of the embodiments of the present disclosure, the terminal can determine CSI-RS configuration information according to the quasi-co-location NZP CSI-RS indication information, and can acquire the large-scale characteristic of the channel. The terminal may perform matching to obtain quasi-co-location information of current data according to the acquired large-scale characteristic of the channel. By virtue of the solution, the problem that a large-scale characteristic of a channel acquired by a terminal is inaccurate due to indefinite indication in quasi-co-location information notification signaling is solved, and an effect of improving channel estimation performance of the terminal is achieved.

What is claimed is:

1. A relationship determining method comprising:
   determining, by a terminal, a set of N quasi-co-location relationship types, N>1 and N being a positive integer;
   when N=1, determining, by the terminal, a quasi-co-location relationship between antenna ports according to the quasi-co-location relationship type; or, when N>1, determining, by the terminal, a set of quasi-co-location relationships between the antenna ports according to the N quasi-co-location relationship types and type indication signaling configured by high-layer signaling;
   wherein the relationship determining method further comprises:
   determining, by the terminal, the set of the N quasi-co-location relationship types according to a Precodin Matrix Indicator (PMI) enabling configuration parameter.

2. The relationship determining method as claimed in claim 1, further comprising:
   determining, by the terminal, the set of the N quasi-co-location relationship types according to a measurement restriction configuration parameter.

3. A non-transitory computer-readable storage medium, storing a computer-executable instruction for performing the method according to claim 2.

4. The relationship determining method as claimed in claim 1, wherein the N quasi-co-location relationship types comprise a following type:
the terminal assumes that dedicated de-Modulation Reference Signal (DMRS) ports 7-14 and Cell specific Reference Signal (CRS) ports 0-3 indicated by quasi-co-location measurement reference signal configuration signaling of a base station are quasi-co-located.

5. A non-transitory computer-readable storage medium, storing a computer-executable instruction for performing the method according to claim 4.

6. A non-transitory computer-readable storage medium, storing a computer-executable instruction for performing the method according to claim 1.

7. A relationship determining device, comprising a hardware processor configured to execute program modules stored on a memory, wherein the program modules comprise:
a third determination module, a fourth determination module and a fifth determination module, wherein the third determination module determines a set of N quasi-co-location relationship types, N≥1 and N being a positive integer;
the fourth determination module is configured to, when N=1, determine a quasi-co-location relationship between antenna ports according to the quasi-co-location relationship type; and
the fifth determination module is configured to, when N>1, determine a set of quasi-co-location relationships between the antenna ports according to the N quasi-co-location relationship types and type indication signaling configured by high-layer signaling;
wherein the hardware processor is further configured to determine the set of the N quasi-co-location relationship types according to a Precoding Matrix Indicator (PMI) enabling configuration parameter.

8. The relationship determining device as claimed in claim 7, wherein the hardware processor is further configured to determine the set of the N quasi-co-location relationship types according to a measurement restriction configuration parameter.

9. The relationship determining device as claimed in claim 7, wherein the N quasi-co-location relationship types comprise a following type:
the terminal assumes that dedicated de-Modulation Reference Signal (DMRS) ports 7-14 and Cell specific Reference Signal (CRS) ports 0-3 indicated by quasi-co-location measurement reference signal configuration signaling of a base station are quasi-co-located.

* * * * *